United States Patent
Nilges

[15] 3,675,673
[45] July 11, 1972

[54] AUTOMATIC DRAIN VALVE

[72] Inventor: William C. Nilges, Kalamazoo, Mich.

[73] Assignee: Parker-Hannifin Corporation, Cleveland, Ohio

[22] Filed: Sept. 25, 1970

[21] Appl. No.: 75,570

[52] U.S. Cl. ........................................137/187
[51] Int. Cl. ........................................F16t 1/00
[58] Field of Search ........................137/187, 183

[56] References Cited

UNITED STATES PATENTS

| | | | |
|---|---|---|---|
| 890,239 | 6/1908 | Kinealy | 137/187 X |
| 3,018,023 | 1/1962 | Talarico | 137/183 X |
| 2,127,649 | 8/1938 | McKee | 137/183 X |
| 899,077 | 9/1908 | Rowe | 137/187 X |
| 2,726,732 | 12/1955 | Faust | 137/195 X |

Primary Examiner—Alan Cohan
Attorney—Oberlin, Maky, Donelly & Renner

[57] ABSTRACT

An automatic drain valve for an air line filter and the like which discriminates between fluids of different viscosities, i.e., air and water, said valve being characterized in that the drain valve member thereof is seated when exposed to the lower viscosity fluid (air) and is unseated when exposed to the higher viscosity fluid (water) by reason of the difference in pressure drop across restrictor means through which the fluids flow. The valve herein is further characterized in that it has a downwardly extending inlet passage which opens near the bottom of the filter bowl and which is so arranged that when the water level in the filter bowl rises to the upper portion of the inlet passage to effect unseating of the drain valve member, the air pressure acting on the water in the filter bowl will cause drainage of the water from the filter bowl until the water level drops down to the lower open end of the inlet passage.

9 Claims, 2 Drawing Figures

INVENTOR.
WILLIAM C. NILGES
BY
Oberlin, Maky, Donnelly & Renner
ATTORNEYS

AUTOMATIC DRAIN VALVE

BACKGROUND OF THE INVENTION

Pneumatic power systems generally include between the compressors and pneumatic actuators thereof air line filters whose function is to remove water and foreign particles which would corrode and damage the downstream equipment such as valves and actuators. Such air line filters comprise a body containing compressed air inlet and outlet passages, a deflector for inducing whirling motion to the compressed air to remove water therefrom by cyclonic or centrifugal action, and a filter element through which the compressed air passes to filter out foreign particles. The body usually has secured thereto a filter bowl which provides a quiet zone in which the water removed from the air by centrifugal action is collected and from which the water is periodically drained either by opening a manually operated drain valve or by opening of an automatic drain valve.

When an automatic drain valve is provide in the filter bowl, the valve member is generally of quite small size and is actuated by a float disposed for upward and downward movement in the filter bowl, and, of course, the larger the drain passage and the greater the air pressure, the larger the float that is required to unseat the pressure seated drain valve member. As evident, the buoyant force must overcome the seating force of air pressure times the area of the seat whereby if the pressure and seat diameter are doubled, the buoyant force must be increased eight times. As an example of a float-type automatic drain valve for an air line filter, reference may be had to the patent to Lansky U.S. Pat. No. 3,330,292 dated July 11, 1967 wherein a pressure seated valve member of relatively small size is unseated by a float which is pivotally mounted in a closure plug in the bottom of the filter bowl and which is linked to the drain valve member to unseat it when the water level in the filter bowl (at prescribed air pressure) reaches a predetermined level.

In view of the small size of the drain valve member in known automatic drain valves, the operating forces are relatively small, and because the valve member is seated by air pressure in the filter bowl, the water level at which the float will open the drain valve member will vary by change in air pressure thus to impose a limit of use of the air line filter to a system having a prescribed range of air pressures, or requiring different floats for different air pressure ranges. Moreover, the small size drain passage in the known float-type automatic drain valves makes it desirable to provide a sump in the closure plug wherein particles of foreign matter removed by centrifugal force may settle so as not to clog the small drain passage of the automatic drain valve, the sump being provided with a removable drain plug so that the collected sediment may be periodically drained therefrom.

SUMMARY OF THE INVENTION

Contrary to known automatic drain valves for air line filters and the like, the present automatic drain valve is of simple, low cost construction comprising a valve body secured in an opening in the bottom of the filter bowl and a drain valve member movable in the body to open and close the drain opening thereof according to whether the drain valve member is exposed to air (the lower viscosity fluid) or to water (the higher viscosity fluid).

The automatic drain valve has large size passages therein thus to entail application of large operating forces thereon to insure reliable and efficient operation even under conditions of dirty water which may pass therethrough from the filter bowl.

The automatic drain valve herein also is operative over a wide range of filter bowl pressure and is insensitive to vibration, the drain valve member being seated with increasing force as the bowl pressure increases thus to enable the use of a simple seat structure.

It is a further object of this invention to provide an automatic drain valve which allows water to accumulate in the filter bowl to a relatively high and constant level before the drain valve member is actuated to open position, but once the drain valve member has moved to open position, the filter bowl is substantially completely drained.

Another object of this invention is to provide an automatic drain valve in which the movable drain valve member is seated by the pressure of the lower viscosity fluid (air) in a chamber having restricted communication with the upstream and downstream sides of the valve member when the level of the higher viscosity fluid (water) is such that there is no flow thereof through the restricted communication between the upstream side of the valve member and the chamber. The movable valve member is unseated by the pressure of the higher viscosity fluid (water) when such fluid commences to flow through the restricted communication between the upstream side and the chamber whereby the pressure of the lower viscosity fluid in the chamber is decreased through the restricted communication of the chamber with the downstream side of the movable valve member. The unseating of the movable valve member permits rapid draining of the filter bowl under the influence of air pressure acting on the water in the filter bowl.

As a further feature of the present invention, the automatic drain valve herein has a submerged inlet passage communicating with the water near the bottom of the filter bowl. Once the drain valve member has been moved to open position when exposed to the water reaching a predetermined level above the submerged opening of the said submerged passage, the air pressure in the filter bowl lifts the water through the submerged passage to permit substantial emptying of the water until the water level drops below the opening in the submerged passage.

Other objects and advantages of the present invention will appear hereinafter.

DETAILED DESCRIPTION OF THE INVENTION

Figure 1:
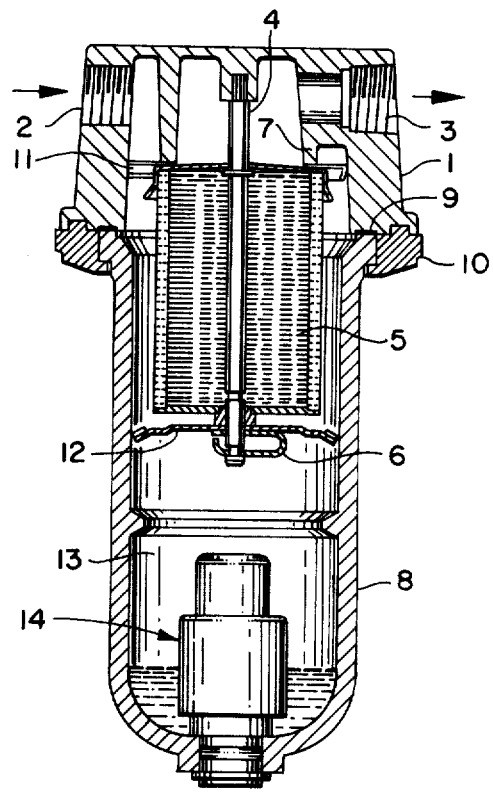
FIG. 1 is a central vertical cross-section view of an air line filter having the automatic drain valve constituting the present invention installed in the bottom of the filter bowl.

Referring first to FIG. 1, the air line filter herein shown for illustrative purposes only, comprises a body 1 having an air inlet port 2, an air outlet port 3, and a center post 4 through which the filter element 5 is sealingly clamped by the spring retainer means 6 to the downwardly depending annular boss 7 in said body 1. The filter element 5 may be of conventional form such as a ribbon type filter which provides edge filtration to move fine particles or a porous sintered bronze filter.

The filter bowl 8 is clamped against a gasket 9 in said body 1 as by means of the clamp collar 10 which is secured to the body 1 as by screws (not shown).

The air that enters the body 1 through the inlet 2 has imparted thereto a whirling motion by the deflector plate 11 whereby larger or heavier solid particles and water particles in the air are thrown out by centrifugal force so as to gravitate along the side wall of the bowl 8. The lower baffle plate 12 stops the whirling motion of the air to thus provide a quiet zone 13 in the lower portion of the filter bowl 8 so that the solids and liquid remain trapped and quiescent in the lower portion of the filter bowl 8. The whirling air moves around the filter element 5 and finds its way to the outlet 3 through the myriad of openings in said filter element 5.

Secured in the bottom of the filter bowl 8 is an automatic drain valve 14, the construction and operation of which will now be described in detail, particularly with reference to FIG. 2.

Figure 2:
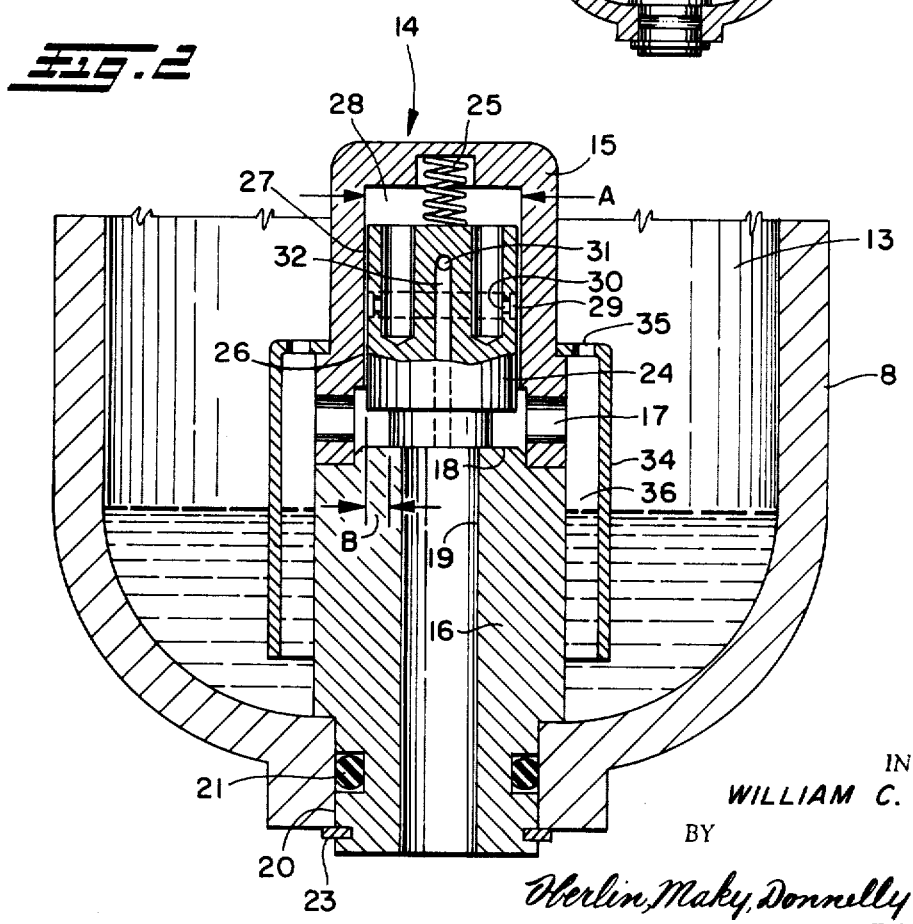
FIG. 2 is an enlarged fragmentary cross-section view of the lower portion of the filter bowl showing the automatic drain valve in cross-section.

As shown in FIG. 2, the automatic drain valve 14 comprises a two-part body 15-16 which forms inlet ports 17, a valve seat 18, and a drain passage or outlet port 19, the lower body part 16 having a reduced stem portion 20 which is sealed as by the O-ring 21 to the opening through the bottom of the filter bowl 8 and which is secured to the bowl 8 as by means of the snap ring 23. The upper body part 15 forms a cylinder for a piston-like valve member 24 having its lower end movable into and out of engagement with the seat 18. The drain valve member 24 is biased to seated position by means of the spring 25 and defines with the upper body part 15 a primary restriction 26 and a secondary restriction 27 preferably in the form of an annular clearance between the outside diameter of the drain valve member 24 and the wall of the bore in the upper body part 15.

The downstream side of the primary restriction 26 is communicated with the chamber 28 via the peripheral groove 29 and the openings 30 in the drain valve member 24. The chamber 28 in turn has minuscule communication with the drain passage 19 via the secondary restriction 27 and the small cross hole 31 which opens at the periphery of the valve member 24 and which intersects the central passage 32 leading to the drain passage 19.

Secured to the upper body part 15 is a skirt member 34 having one or more openings 35 at its upper end and defining a downwardly extending inlet passage 36 which opens near the bottom of the filter bowl 8. As hereinafter explained in detail, when the water level rises to the level whereat the valve member 24 is moved away from the seat 18, the flow of water from the filter bowl 8 will continue until the water level drops below the lower edge of the skirt member 34.

When the water level in the bowl 8 and in the skirt member 34 is below the upstream end of the primary restriction 26 and the upper edges of the inlet openings 17, the flow of air from the chamber 28 to the drain passage 19 via the second restriction (clearance 27 and small opening 31) is so slight that the pressure on opposite sides of the drain valve member 24 are substantially equalized through the primary restriction 26, whereby the drain valve member 24 is held in seated position by the force exerted by the spring 25, by gravity, and the air pressure in the chamber 28 acting on the area A which is greater than the upward force resulting from the pressure acting on the annular area B. Thus, the valve member 24 is held in seated position when the water level is below the upper edges of the inlet ports 17 and the lower upstream end of the primary restriction 26.

Now, when the water level rises above ports 17, air in the passage 36 is displaced through openings 35 until the water level reaches the lower upstream end of the primary restriction 26 at which time the increased pressure drop across restriction 26 will permit a decrease in air pressure in chamber 28 via the secondary restriction 27. As the air pressure in the chamber 28 decreases relative to the upward pressure acting on the annular area B, the point will be reached where the then predominant upward force on the area B will overcome the bias of the spring 25, the weight of the drain valve member 24, and the low air pressure acting downwardly on the area A of the drain valve member 24. When this occurs, the drain valve member 24 will be forced upwardly away from the seat 18 to initiate drain flow from the filter bowl 8 through the passage 36, the inlet ports 17 and the drain passage 19.

When drain valve member 24 has thus been moved upwardly away from seat 18, the pressure drop thereat and at the openings 35 relative to the pressure at the lower end of the inlet passage 36 will maintain continued upward water flow through passage 36 under the influence of air pressure acting on the surface of the water around the skirt member 34 until the water level drops below the lower edge of the skirt member 34. When that occurs, water flows downwardly in passage 36 thus to allow air to flow into chamber 28 via the primary restriction 26 to build up in the chamber 28 to urge the valve member 24 downwardly against the seat 18 to prevent air leakage except the small amount which leaks through the secondary restriction 27.

I, therefore, particularly point out and distinctly claim as my invention:

1. An automatic drain valve for an air line filter and the like having a water collecting bowl comprising a valve body having a passage through which water in the bowl may be drained and having a valve seat; said passage, upstream of said seat, having a downwardly extending portion which has upper and lower openings leading into said bowl at vertically spaced locations near the bottom of said bowl and thereabove, a valve member movable in said body into and out of engagement with said seat; said valve member and body defining a chamber which has restricted communication with the portions of said passage which are respectively upstream and downstream of said seat; said valve member having areas on opposite sides thereof which are exposed to fluid under pressure in said chamber and in said upstream passage portion; said restricted communication being such that when air flows into and from said chamber via said restricted communication, the air pressure in said chamber is sufficient to hold the valve member in engagement with said seat to prevent air flow through said passage; the restricted communication between said upstream passage portion and said chamber further being such that when the water level in the bowl rises sufficiently to commence to flow through said restricted communication into said chamber, the pressure drop of the water therein permits the air pressure in said chamber to be decreased through the restricted communication of said chamber with said downstream passage portion whereby predominant water pressure in the upstream passage portion acts on said valve member to move the latter out of engagement with said seat for upward flow of water through said downwardly extending portion thereby effecting drainage of water through said passage until the water level in said bowl falls to said lower opening.

2. The valve of claim 1 wherein the area of said valve member which is exposed to fluid pressure in said chamber is greater than the area thereof which is exposed to fluid pressure in said upstream passage portion.

3. The valve of claim 1 wherein the air pressure drop across the restricted communication between said chamber and said downstream passage portion is respectively greater than and less than the air and water pressure drops across the restricted communication between said chamber and said upstream passage portion.

4. The valve of claim 1 wherein the flow capacity of the restricted communication between said chamber and said downstream passage portion is less than the flow capacity of the restricted communication between said chamber and said upstream passage portion thus to effect buildup of air pressure in said chamber to retain said valve member in engagement with said seat and to minimize leakage of air to the downstream passage portion via such restricted communication.

5. The valve of claim 1 wherein the restricted communication between said upstream passage portion and said chamber comprises an annular clearance between said valve member and a bore in said body in which said valve member moves into and out of engagement with said seat.

6. The valve of claim 1 wherein the restricted communication between said chamber and said downstream passage portion comprises an orifice in said valve member which opens to an annular clearance between said valve member and a bore in said body in which said valve member moves into and out of engagement with said seat.

7. The valve of claim 1 wherein said upper opening is at least at the level of the restricted communication between said upstream passage portion and said chamber whereby when the water level in said bowl rises therein and within said downwardly extending portion to commence to flow through said last mentioned restricted communication the valve member will be moved out of engagement with said seat as aforesaid.

8. The valve of claim 1 wherein said downwardly extending portion comprises a skirt member spaced around said body; said skirt member having an orifice at its upper end to define said upper opening and being open at its lower end to define said lower opening, said orifice being operative to prevent air from being trapped as the water level rises between said skirt member and said body and further being operative to permit air pressure acting on the water outside said skirt member and above the lower end thereof to cause upward flow of water through said downwardly extending portion for discharge through said upstream and downstream passage portions when said valve member is moved out of engagement with said seat.

9. The valve of claim 1 wherein said body extends into and is sealed in an opening through the bottom of said bowl; and wherein said downstream passage portion extends downwardly through said body for water drainage flow from the bottom of said bowl.

* * * * *